(12) United States Patent
Bronnert

(10) Patent No.: US 11,346,481 B2
(45) Date of Patent: May 31, 2022

(54) CAM CLAMP

(71) Applicant: Herve' X. Bronnert, Brookfield, WI (US)

(72) Inventor: Herve' X. Bronnert, Brookfield, WI (US)

( * ) Notice: Subject to any disclaimer, the term of this patent is extended or adjusted under 35 U.S.C. 154(b) by 299 days.

(21) Appl. No.: 16/288,743

(22) Filed: Feb. 28, 2019

(65) Prior Publication Data

US 2019/0264852 A1    Aug. 29, 2019

Related U.S. Application Data

(60) Provisional application No. 62/636,694, filed on Feb. 28, 2018.

(51) Int. Cl.
*F16L 37/18* (2006.01)

(52) U.S. Cl.
CPC .................................... *F16L 37/18* (2013.01)

(58) Field of Classification Search
CPC ............ F16L 37/18; F16L 33/12; F16L 23/06
See application file for complete search history.

(56) References Cited

U.S. PATENT DOCUMENTS

| 144,997 | A | 11/1873 | Mayall |
| 204,770 | A | 6/1878 | Smith |
| 207,470 | A | 8/1878 | Wolf |
| 533,419 | A | 1/1895 | Winkler |
| 1,007,326 | A | 10/1911 | Boyd |
| 1,110,011 | A | 9/1914 | Schneider |
| 1,162,362 | A | 11/1915 | Hyland |
| 1,223,054 | A | 4/1917 | Kertesz |
| 1,456,761 | A | 5/1923 | Bylund |
| 1,518,479 | A | 12/1924 | Brewer |
| 1,646,463 | A | 10/1927 | Stokesberry |

(Continued)

FOREIGN PATENT DOCUMENTS

| CH | 615988 | 2/1980 | |
| DE | 801355 C | * 1/1951 | ............... F16L 33/12 |

(Continued)

OTHER PUBLICATIONS

"The Perfect Surface Hygienic Seal System, Featuring Torque-Rite TM and the Perfect Surface Hygienic Seal," Rubber Fab Technologies Group, CR 2004-2009, rev. Jun. 2009, 4 pages.

*Primary Examiner* — Matthew Troutman
*Assistant Examiner* — Alexander T Rufrano
(74) *Attorney, Agent, or Firm* — Rathe Lindenbaum LLP

(57) ABSTRACT

A cam assembly includes a first arcuate segment having a first extension, a second arcuate segment having a second extension. The first and second arcuate segments are coupled together for movement with respect to one another. An elongated member includes a first end and a second end, the first end being pivotally coupled to the second extension. The first extension member includes a raised surface portion that extends away from the first arcuate segment and extends away from the second extension. A cam member pivotally secured to the elongated member proximate the second end, the cam member contacting both the portion of the first arcuate segment and a portion of the raised surface portion of the first extension as the cam is rotated from a closed to open position.

12 Claims, 5 Drawing Sheets

(56) References Cited

U.S. PATENT DOCUMENTS

| | | | | |
|---|---|---|---|---|
| 2,673,102 | A * | 3/1954 | Hutchinson | F16L 23/06 |
| | | | | 285/409 |
| 2,706,648 | A | 4/1955 | Gosse | |
| 2,725,246 | A | 11/1955 | Weinhold | |
| 2,752,174 | A | 6/1956 | Frost | |
| 2,775,806 | A | 1/1957 | Love | |
| 3,151,895 | A | 10/1964 | Ward | |
| 3,201,156 | A | 8/1965 | Coats | |
| 3,705,737 | A | 12/1972 | Westerlund et al. | |
| 3,828,403 | A | 8/1974 | Perrin et al. | |
| 3,979,143 | A | 9/1976 | Weinhold | |
| 4,189,172 | A * | 2/1980 | Perrin | F16L 23/22 |
| | | | | 285/12 |
| 4,311,248 | A | 1/1982 | Westerlund et al. | |
| 4,561,678 | A | 12/1985 | Kunsman | |
| 4,573,717 | A | 3/1986 | Peacock | |
| 4,639,979 | A | 2/1987 | Polson | |
| 4,643,460 | A | 2/1987 | Lieberg | |
| 4,660,869 | A | 4/1987 | Gabus | |
| 4,924,913 | A | 5/1990 | Pedersen | |
| 4,969,923 | A | 11/1990 | Reeder et al. | |
| 5,351,368 | A | 10/1994 | Borst | |
| 5,380,052 | A | 1/1995 | Hendrickson | |
| 5,988,694 | A | 11/1999 | Brushaber | |
| 6,082,941 | A | 7/2000 | Dupont et al. | |
| 6,672,631 | B1 | 1/2004 | Weinhold | |
| 7,240,930 | B2 | 7/2007 | Stravitz | |
| 7,364,205 | B2 | 4/2008 | Weinhold | |
| 7,828,340 | B2 | 11/2010 | Heelan et al. | |
| 7,931,310 | B2 | 4/2011 | Lake | |
| 7,967,343 | B2 | 6/2011 | Bortoli | |
| 8,371,623 | B2 * | 2/2013 | Bronnert | F16L 23/06 |
| | | | | 285/409 |
| 2004/0061335 | A1 | 4/2004 | Mills | |
| 2006/0273589 | A1 | 12/2006 | Weinhold | |
| 2010/0038903 | A1 | 2/2010 | Linhorst et al. | |
| 2011/0101687 | A1 | 5/2011 | Heelan, Jr. et al. | |

FOREIGN PATENT DOCUMENTS

| | | | | |
|---|---|---|---|---|
| EP | 0042168 A1 * | 12/1981 | | F16L 23/06 |
| GB | 412186 A * | 6/1934 | | F16L 17/04 |
| GB | 859239 A * | 1/1961 | | F16L 23/06 |
| GB | 956114 A * | 4/1964 | | F16L 23/06 |

* cited by examiner

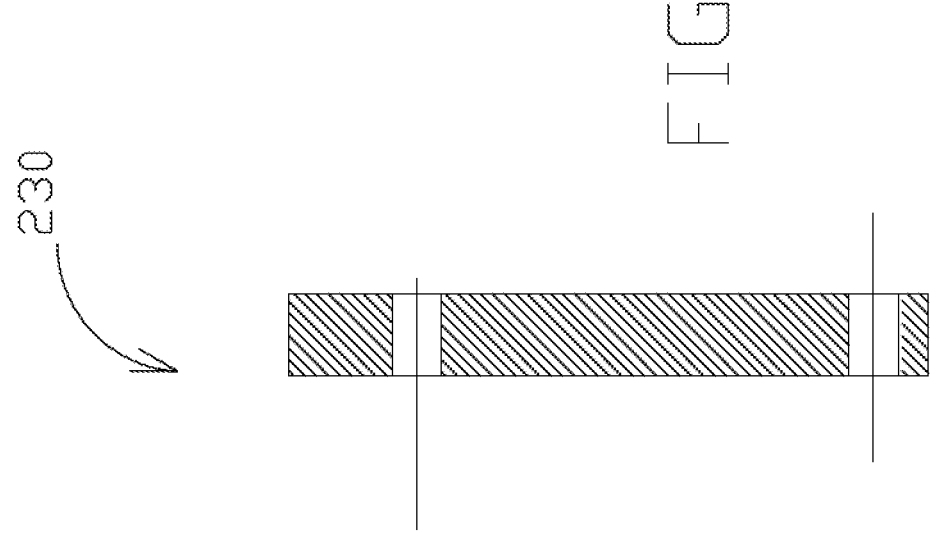
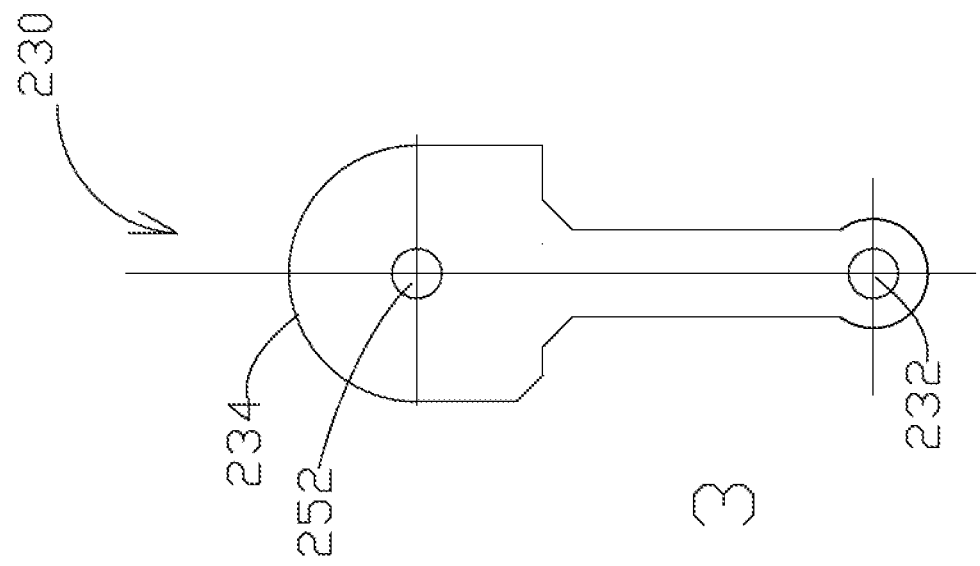
FIG. 4
FIG. 3

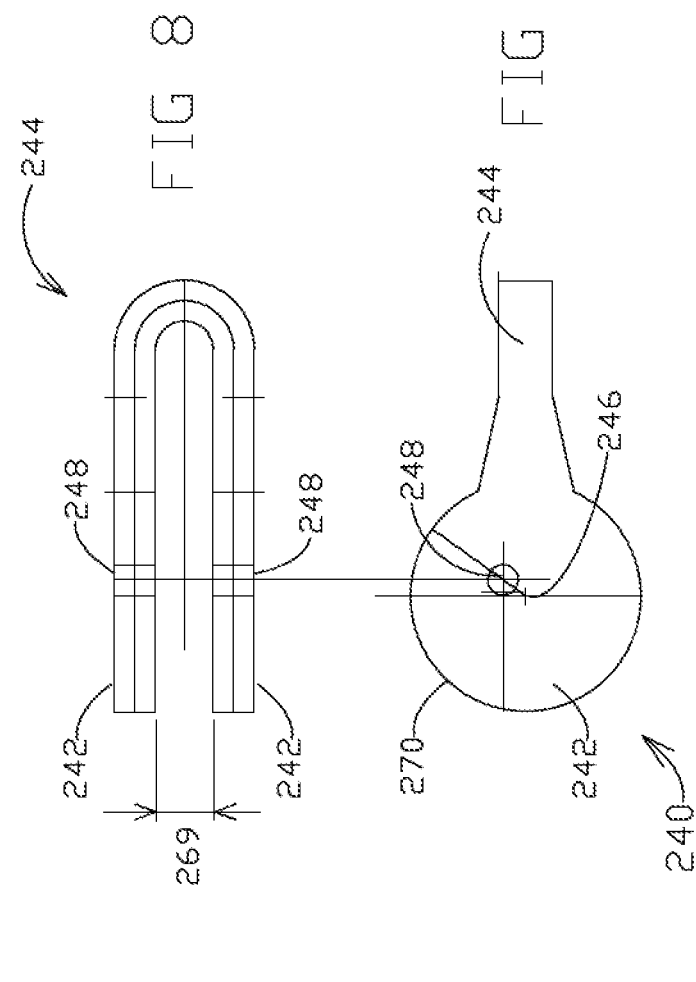

CAM CLAMP

CROSS-REFERENCE TO RELATED PATENT APPLICATIONS

This application claims the benefit of U.S. Provisional Application No. 62/636,694 entitled Cam Clamp and filed on Feb. 28, 2018 which is herein incorporated by reference in its entirety.

BACKGROUND

The present invention relates to a clamp assembly. The present invention relates more particularly to a cam clamp assembly for use in connecting piping and equipment in sanitary systems such as liquid food products and pharmaceuticals. The present invention relates still more particularly to a cam clamp assembly having a cam that is rotatable about an off-center axis by a handle in a progressive wedging interaction to releasably secure the clamp in a manner that provides a predetermined amount of compression.

It is well known to provide sanitary fittings for use in processing, manufacturing and/or handling liquid food products and pharmaceutical products. Such sanitary fittings are typically used to connect piping and equipment such as pumps, tanks, filters, valves, heat exchangers, fillers, etc. One example of a typical sanitary fitting includes two ferrules (one each on two adjacent components to be connected), a gasket disposed between the ferrules, and a clamp that fits over the ferrules and is secured around the ferrules. Most clamps in such typical sanitary fittings include a bolt pivotally mounted to a lower half of the clamp by a pin, and a wing nut mounted on the bolt. The bolt is rotated into a slot on the upper half of the clamp and the wing nut is tightened to secure clamp over the ferrules and gasket.

However, such known sanitary fittings have a number of disadvantages. For example, a certain amount of friction usually exists between the wing nut and the bolt, and between the wing nut and the upper half of the clamp as the wing nut is tightened on the bolt. The degree of friction at these two interfaces tends to vary greatly from one application to another, which often results in an inconsistent amount of compression applied by the clamp to the ferrules and gasket. The inconsistent compression often leads to misalignment of the ferrules and/or gasket and leakage at the fitting. Attempts to correct such leakage usually lead to over-tightening the clamp which tends to damage the nut, bolt, gasket and/or clamp and further exacerbate the leakage. Such conventional clamps are also typically time-consuming to install, open, close, and repair.

Accordingly, it would be desirable to provide a clamp assembly that overcomes the disadvantages of the conventional clamps. It would also be desirable to provide a clamp assembly that is easily and quickly installed and that provides a more consistent amount of compression of the fitting components. It would be further advantageous to provide a clamp assembly having an off-center rotatable cam that provides a progressive wedging interaction with a tactile and/or auditory indication that the desired amount of compression of the fitting components has been achieved.

SUMMARY

A cam assembly includes a first arcuate segment having a first extension, a second arcuate segment having a second extension. The first and second arcuate segments are coupled together for movement with respect to one another. An elongated member includes a first end and a second end, the first end being pivotally coupled to the second extension. The first extension member includes a raised surface portion that extends away from the first arcuate segment and extends away from the second extension. A cam member pivotally secured to the elongated member proximate the second end, the cam member contacting both the portion of the first arcuate segment and a portion of the raised surface portion of the first extension as the cam is rotated from a closed to open position.

BRIEF DESCRIPTION OF THE DRAWINGS

FIG. 3 is a schematic diagram of a front elevation view of the insert according to the exemplary embodiment of FIG. 2.

FIG. 4 is a side view of a portion of the insert of FIG. 3.

FIG. 6 is a plan view of the cam and handle blank in a flat configuration.

FIG. 7 is a plan view of the cam and handle in the folded configuration.

FIG. 8 is a side cross sectional view of the cam and handle of FIG. 7.

DETAILED DESCRIPTION OF THE EXAMPLE EMBODIMENTS

Referring to the FIGURES, a cam clamp assembly is shown according to several embodiments having a cam that is rotatable about an off-center axis by a handle to releasably secure the clamp in a manner that provides a predetermined amount of compression. The cam clamp assembly is easily and quickly installed and provides a more consistent amount of compression of the fitting components, and has an off-center rotatable cam that provides a tactile and/or auditory indication when the desired amount of compression of the fitting components has been achieved. Although the cam clamp assembly has been shown and described according to the exemplary embodiments for use with sanitary fittings in systems for processing, manufacturing and/or handling liquid food products and pharmaceutical products, the cam clamp assembly may be used in a wide variety of other types of systems for joining tubular components to one another, and may be provided in any of a wide variety of dimensions for use in joining components in a wide variety of sizes and materials.

Figure 1:
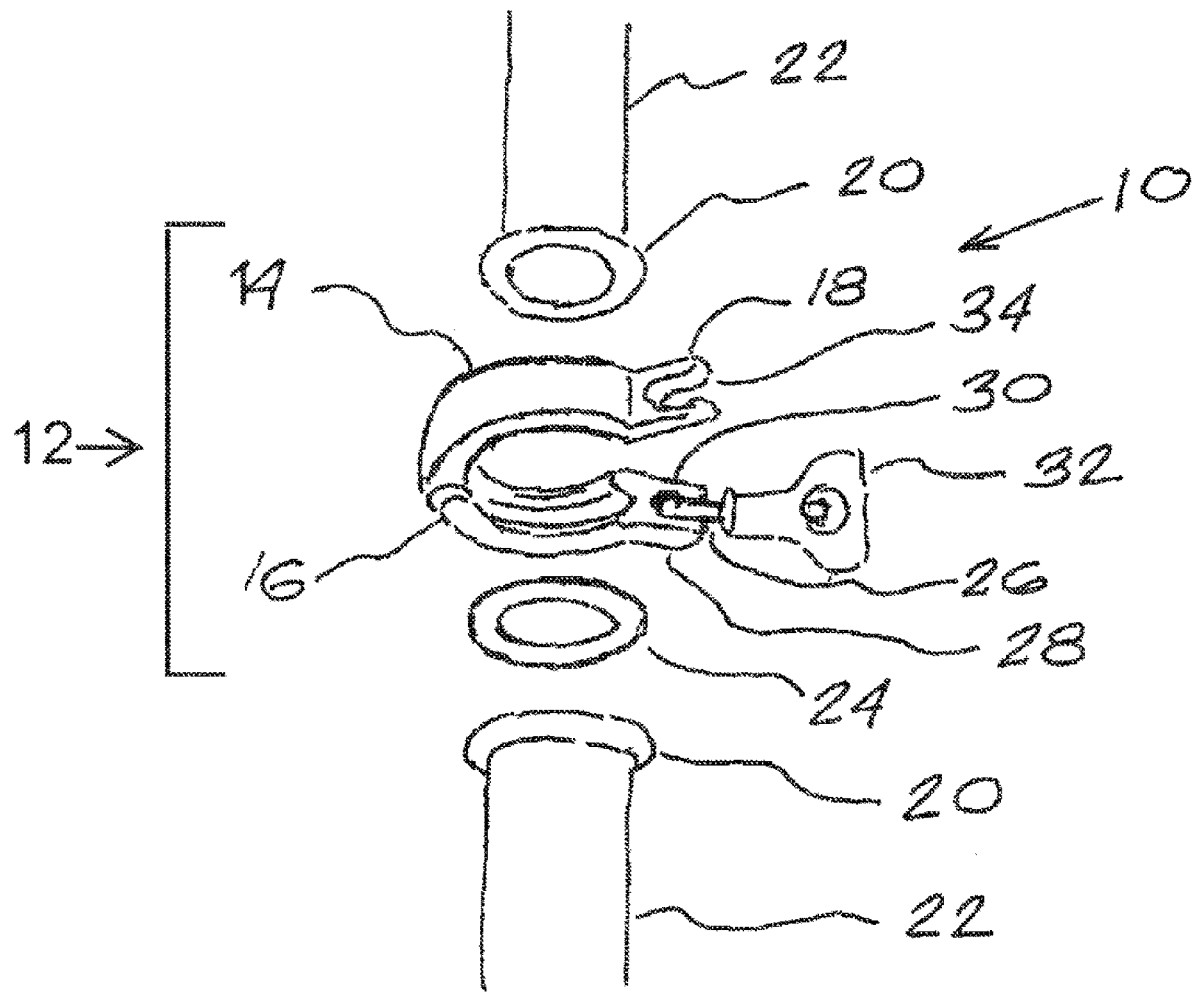
FIG. 1 is a schematic diagram of a prior art sanitary fitting having a clamp.

Referring to FIG. 1, a conventional clamp assembly 10 for a sanitary fitting 12 is shown for illustrative purposes. Sanitary fitting 12 includes two ferrules 20 (one each on two adjacent components, shown as pipes or tubes 22, to be connected), a gasket 24 disposed between the ferrules 20, and a clamp assembly 10 that fits over the ferrules 20 and is secured around the ferrules 20. Clamp assembly 10 includes a bolt 26 pivotally mounted to an extension 28 on one segment of the clamp (shown as a lower segment 16 of the clamp) by a pin 30, and a wing nut 32 mounted on the bolt 26. To close the clamp and secure the sanitary fitting, the clamp assembly 10 is opened and the segments (shown as an upper segment 14 and the lower segment 16) are placed about the ferrules 20 and gasket 24 and the upper and lower segments 14, 16 are closed together. The bolt 26 is rotated into a slot 34 on an extension 18 on the upper segment 16 of the clamp assembly 10 and the wing nut 32 is tightened against extension 18 to draw the upper and lower segments 14, 16 together to secure the clamp assembly 10 over the ferrules 20 and gasket 24.

The clamp assembly 10 for sanitary fitting 12 tends to have a number of disadvantages. For example, a certain amount of friction usually exists between the wing nut 32 and the bolt 26, and between the wing nut 32 and the extension 18 on the upper segment 14 of the clamp 10 as the wing nut 32 is tightened on the bolt 26. The degree of friction at these two interfaces tends to vary greatly from one application to another, which often results in an inconsistent amount of compression applied by the clamp assembly 10 to the ferrules 20 and gasket 24. The inconsistent compression often leads to misalignment of the ferrules 20 and/or gasket 24 and leakage at the sanitary fitting 12. Attempts to correct such leakage usually lead to over-tightening the clamp which tends to damage the ferrules, gasket and/or clamp and further exacerbate the leakage. Such clamps are also typically time-consuming to install, open, close, and repair.

Figure 2:
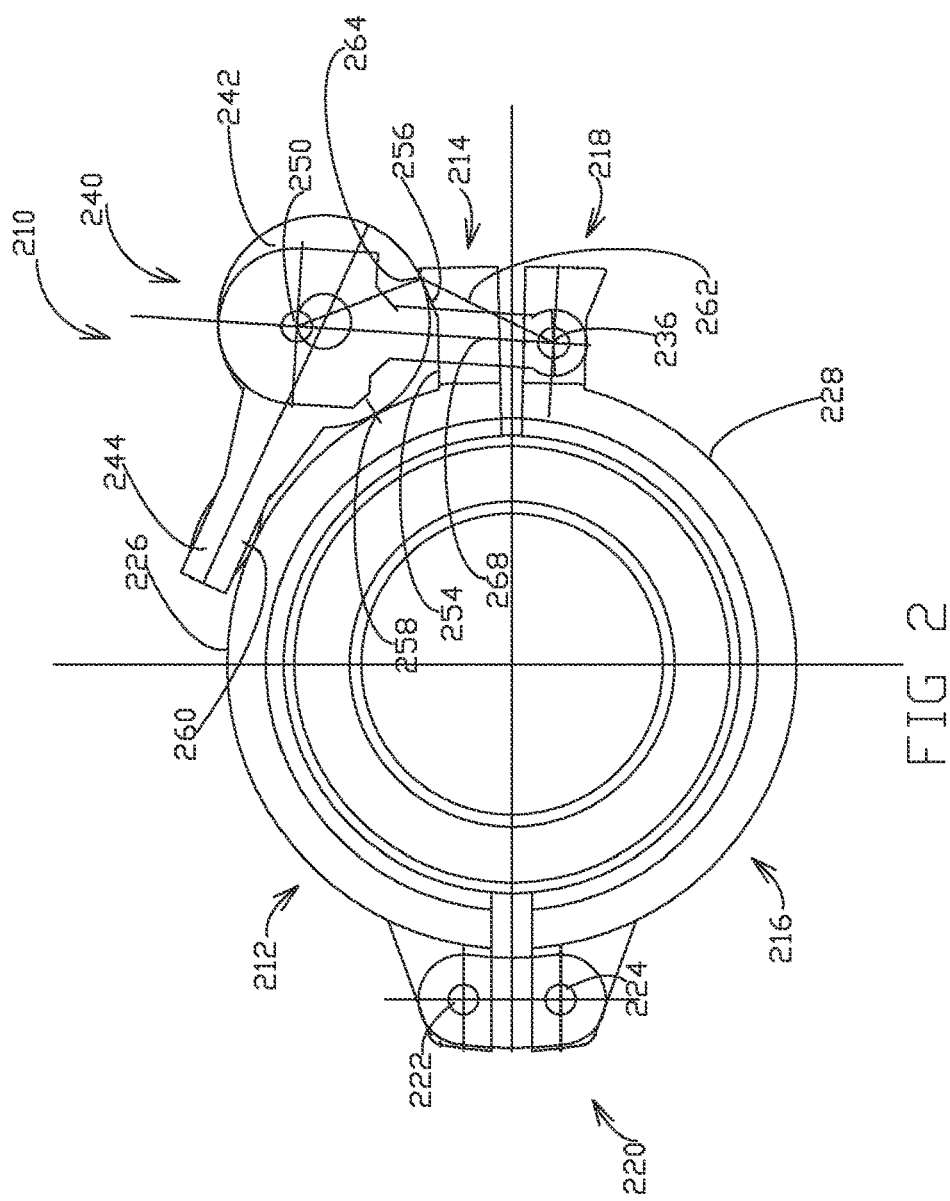
FIG. 2 is a schematic diagram of a front elevation view of a cam clamp assembly in a closed position, according to an exemplary embodiment.

Referring to FIG. 2, a cam clamp assembly 210 for a sanitary fitting is shown according to an exemplary embodiment. The cam clamp assembly 210 is shown to include a first arcuate segment 212 having a first extension 214 and a second arcuate segment 216 having a second extension 218. Together, the arcuate segments define an opening or cavity therebetween for securing components (e.g. ferrules, gaskets, etc.) of a sanitary fitting. The first and second arcuate segments 212, 216 are pivotally coupled together on a first side at a first pivot connection 220. In one embodiment pivot connection includes a single pin (not shown) and in one embodiment first pivot connection includes a first pin 222 and a second pin 224. However other suitable pivot connections known in the art may be used. Segment 212 and segment 216 pivot about first pivot connection 220 for movement of the segments 212, 216 with respect to one another, where segment 212 pivots about first pin 222 and segment 216 pivots about second pin 224.

Segment 212 includes a convex outer surface 226 and segment 216 includes a convex outer surface 228. As the first and second segments 212, 216 are moved about the respective axes pins 222 and 224, the first and second extensions 214, 218 on an opposite side of the segments 212, 216 are brought toward (or away) from one another so that the segments 212, 216 may be positioned about the sanitary fitting components and then the first and second extensions 214, 218 brought into a close relationship (i.e. generally adjacent to one another).

Referring to FIGS. 2-5 cam clamp assembly 210 includes a link insert 230 having a first end 232 and a second end 234. The first end 232 is pivotally coupled to the second extension 218 at a second extension pivot connection 236 for movement of the link insert 230 about a second extension axis 238 the second extension axis being substantially parallel to the axis of pins 222, 224 so that a second end 234 of the link insert 230 is receivable above the first extension 214 through a slot 269 in the first extension 214.

Referring to FIGS. 2-8 cam clamp assembly 210 includes a cam 240 having a pair of cam members 242 coupled to one another through handle portions 244. Each cam member 242 has opening 248 offset from the center point 246 of the outer circumference 270 of cam members 242. Second end 234 of link insert 230 is positioned intermediate the pair of cam member 242. A pin 250 extends through an opening 252 in link insert 230 and through openings 248 in cam members 242. In this manner cam members 242 pivot about pin 250 while link insert pivots about pin 237. In one embodiment link insert 230 is a non-threaded member.

Stated another way link insert 230 is in an offset configuration at a pivot pin 250 for movement of the cam member 242 about a cam pivot axis 252. The cam axis pivot 252 being substantially parallel to the axis of pin 222 and axis of pin 224.

Referring to FIGS. 6-8 in one embodiment cam member 242 and a handle member 244 are integrally formed as a single member. Handle portions 244 (e.g. lever, tab, extension, etc.) are configured to rotate the cam member portions 242 about the cam pivot axis 252 between an open position and a closed position as illustrated in FIG. 2. In one embodiment, the rotational travel of the integrated cam members 242 and handle portions 244 between the open position and the closed position is approximately 180 degrees (although other ranges of travel may be used to suit a particular application). The handle 244 is shown to contact segment 212 at a contact point 260 that acts as a cam travel stop that provides a tactile and/or audible indication (e.g. click, etc.) that a predefined compression of the first and second segments 212, 216 about the sanitary fitting components has been obtained when the cam members 242 has been rotated to the closed position by handle 244.

Referring to FIG. 2 first extension 214 includes a first portion 254 that is positioned intermediate first segment 212 and link insert 230 and a second portion 256 that extends from first portion 254 in a direction away from segment 212 and in a direction away from second extension 218. In one embodiment second portion 256 is planar and extends in direction both away from segment 212 and away from second extension 218. In one embodiment second portion 256 is arcuate forming a concave shape. In one embodiment second portion is non-planar but includes regions that extend away from the first pivot connection 220 and away from second extension 218.

As handle 244 is moved from an open position to a closed position cam member 242 remains in contact with both the second portion 256 of the first extension 214 and with a contact line 258 of the first segment 212 intermediate contact point 260 of handle and first segment 212 and first extension member 214.

The predefined compression of the sanitary fitting components is intended to create a force sufficient to seal the fitting components to one another, without creating excessive force that might tend to misalign or damage the fitting components. The predefined compression is established by the degree of offset of the cam member 242 to the cam pivot axis 252. According to one embodiment, the degree of offset of the cam member 242 provides a closing travel of within a range of approximately 0.250-0.375 inches between the first and second extensions 214, 218 as the handle 244 is moved from the open position to the closed position (however, the degree of offset may provide any suitable amount of closing travel necessary to obtain a desired compression of the fitting components).

According to the illustrated embodiment, the cam member 242 and handle 244 are configured to rotate in a counterclockwise direction so that the end of handle 244 contacts the first segment 212 (to provide the tactile and/or audible indication) at a contact point 260 and to act as a travel stop to prevent over tightening of the fitting components. The line of force 268 from pin 250 and pin 237 of second extension pivot connection 236 has a positive distance to contact line 264. The cam members 242 are always in contact with two contact lines 258 and 264 at the critical time of starting to open, at closing and in closed position. In the closed position, this maintains a positive closing force on the handle 244 with cam travel stop 260. At opening, the handle 244 is pulled away from first actuate segment 212 with a steady force to rotate the cam 240. During the first stage of opening, this line of force is still unchanged in relation to contact lines 258 and 264. As the cam 240 is rotated clockwise, contact lines 258 and 264 enable sliding of the cam members 242 which starts to gradually release the existing tension in the cam clamp assembly. Inclined second portion 256 and contact line 264 of first extension 214 maintain a force which avoids a sudden surge of the cam clamp opening. During the second stage of opening, additional clockwise rotation of the cam 240 moves cam members 242 away from contact lines 258 and 264 and inclined second portion 256 allowing cam 240 and link insert 230 both to rotate from second extension pivot connection 236. This allows first actuate segment 212 to separate from second actuate segment 214 opening cam clamp assembly.

Referring to FIG. 2 when handle 244 is in the closed position a first contact line 262 is defined by second pivot extension connection 236 and the contact point 264 between the cam 240 and the second portion 256 of the first extension 214. First contact line 262 is not colinear or parallel to a link line 268 defined by second pivot extension connection 236 and pin 250. When handle 244 is in the closed position cam 240 is in contact with first segment 212 at a contact point 260. Accordingly, in one embodiment when handle 244 is in the closed position handle 244 contacts first segment 212 at a contact point 260, each cam member 242 is in contact at respective contact points 258 and 264.

Figure 9:
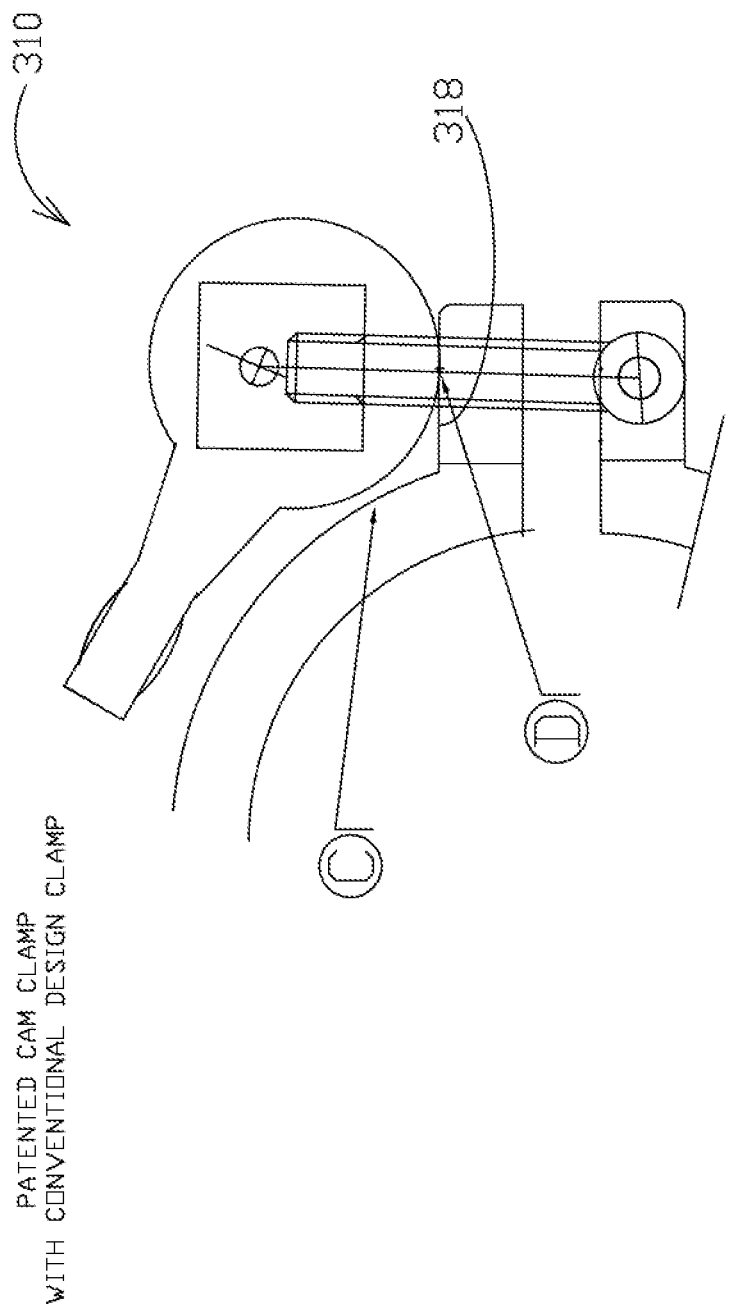
FIG. 9 is a schematic diagram of a cam clamp assembly disclosed in U.S. Pat. No. 8,371,623 moving from a closed to open position.

Referring to FIG. 9 a cam clamp assembly 210 as shown and described in U.S. Pat. No. 8,317,623 incorporated herein by reference in its entirety includes a handle between an open and closed position. In FIG. 9, there is no sliding movement of cam member and its circular surface with the extension surface which generates a higher opening force in the open position. Referring to FIG. 2 in one embodiment described herein the inclined second portion 256 of first extension 214 acts to maintain the circular outer surface of the cam 270 in direct contact with contact lines 258 and 264. This contact at both contact lines 258 and 264 provide for less force as the cam members 242 rotate and slide between contact lines 258 and 264 as the handle 244 is being moved from closed to open position.

The cam's first rotation opening is guided by 258 and 264 which results in a semi-open clamped condition. In other words, the cam's first rotation is stopped by 264 from fully opening the clamp. A second rotation of link insert 230 is needed so the circular outer surface of the cam 270 clears second portion 256 to fully open the clamp.

Referring to FIG. 2 pin 237 and pin 250 generate a direction of force between 236 and 250 along centerline 268 positioned between contact lines 264 and 258 of the first accurate segment 212 which exerts a positive force keeping the cam 240 closed at point 260. More pressure in the inside of the fitting will further maintain this cam-handle in a closed position.

Figure 5:
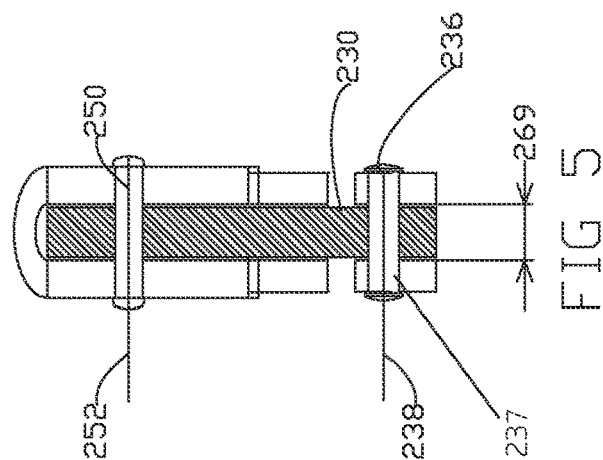
FIG. 5 is side elevation view of the cam clamp assembly according to the embodiment of FIG. 2.

Referring to FIG. 5 link insert 230 is one piece. It is flat and is not threaded. It is preferable to avoid exposed bolts or threaded parts in sanitary pharmaceutical or aseptic environments.

Referring to FIGS. 2-5, link insert 230 provides a positive and rigid alignment of the cam clamp assembly 210 with the clamp 212 which does not exist with the threaded rod and nut approach in U.S. Pat. No. 8,371,623. Link insert 230 is guided and aligned by the second extension 218, slot 269 and pin 237. Engaging link insert 230 into slot 269 of the first extension 214 aligns the first actuate segment 212 and first extension 214. Both surfaces of the link insert second ends 234 fit into slot 269 between both cam members 242 and are held in position by pin 250.

Referring to FIG. 3 link insert second end 234 is wider than the nut in U.S. Pat. No. 8,371,623. The link insert second end 234 guides the cam 240 with precision during its rotation. Cam 240 remains centered against 212 and keeps it rigid.

The one piece link insert 230 and its close rotation around the pin 237 results in a positive and rigid alignment of the cam 240 with the clamp. This guides the cam handle 244 with precision.

Between the two lines of contact, 258 and 264, there is a wider space than in U.S. Pat. No. 8,371,623. This and the increased distance to the contact point 264 promote a sliding of the circular outer surface of the cam 270.

According to any exemplary embodiment, a cam clamp assembly for a sanitary fitting includes an offset cam member that is releasably movable onto an outer surface of one segment of the clamp and is rotatable to draw both clamp segments together until a tactile and/or audible indication occurs to create a more consistently applied and predetermined amount of compression of the fitting components.

It is important to note that the construction and arrangement of the elements and embodiments of the cam clamp assembly provided herein are illustrative only. Although only a few exemplary embodiments of the present invention have been described in detail in this disclosure, those skilled in the art who review this disclosure will readily appreciate that many modifications are possible in these embodiments (such as variations in fittings, structures, shapes, dimensions and proportions of the clamp components, use of materials, etc.) without materially departing from the novel teachings and advantages of the invention. Accordingly, all such modifications are intended to be within the scope of the invention.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A cam clamp assembly comprising:
   a first arcuate segment having a first arcuate portion and a first extension extending from the first arcuate portion, a second arcuate segment having a second arcuate portion and a second extension extending therefrom, the first and second arcuate segments coupled together for movement with respect to one another distal the first extension and the second extension;
   a link insert having a first end and a second end, the first end pivotally coupled to the second extension for movement of the link insert about a second extension pivot axis;
   the first extension including an inclined portion that extends in a direction away from the first arcuate portion and away from the second extension;

a cam member pivotally coupled to the link insert proximate the second end of the link insert, the cam member having a circular portion including an outer cam surface contacting both a portion of the first arcuate segment at a second contact line and the inclined portion of the first extension at a first contact line as the cam member is rotated from a closed position toward an open position;

wherein the outer cam surface has a first profile that is different than a second profile of the inclined portion of the first extensions;

wherein the cam member is pivotally coupled to the link insert proximate the second end with a pivot pin and moves in a circle concentric to a center of the cam member while the outer cam surface remains in contact with the inclined portion and the first arcuate portion at the first contact line and the second contact line respectively, wherein the outer cam surface is circular, and the cam member rotates about the center of the cam member, and the center of the cam member does not move relative to the first contact line and the second contact line as a handle connected to the cam member is rotated from a closed position toward an open position.

2. The cam clamp assembly of claim 1, wherein the first extension includes a first flat portion between the inclined portion and the first arcuate portion, the first extension having a slot removably receiving the link insert therethrough; the first extension including an upper surface proximate the slot along the first flat portion and angled to the inclined portion, wherein the upper surface of the inclined portion has a geometry different than the upper surface of the first flat portion.

3. The cam clamp assembly of claim 1, wherein an upper surface of a first flat portion of the first extension does not contact the outer cam surface when the handle of the cam member is in the closed position; and wherein the upper surface of the inclined portion at the first contact line remains in contact with the outer cam surface when the handle is in the closed position.

4. The cam clamp assembly of claim 1, wherein the cam member remains in contact with and slides on the first arcuate portion at the second contact line of the first arcuate segment and on the inclined portion at the first contact line as the cam member is rotated from a closed position toward an open position for a first amount of rotation.

5. The cam clamp assembly of claim 4, wherein a tension in the cam clamp assembly is gradually released as the cam member is rotated from the closed position toward the open position.

6. The cam clamp assembly of claim 5, wherein the cam member separates from the inclined portion when the cam member is rotated beyond the first amount of rotation.

7. The cam clamp assembly of claim 1 wherein a line of force extends from the second extension pivot axis to a pivot pin and is between the first contact line and the second contact line during rotation of the handle of the cam member.

8. The cam clamp assembly of claim 1, wherein the center of the cam member is free of a pin which enables a larger surface of a second link end to fit inside the cam member to guide rotation of the cam member.

9. The cam clamp assembly of claim 1, wherein pivot pin moves in a circle concentric and is close to and spaced from the center of the cam member which amplifies a force of the handle of the cam member, a line of force extends from the second extension pivot axis to pivot pin and keeps the cam member in contact with the first contact line and the second contact line during rotation of the cam member.

10. The cam clamp assembly of claim 1, wherein a first line of force is defined from the second contact line to pivot pin and a second line of force is defined from the first contact line to the pivot pin, the first line of force and the second line of force balance a link line of force to maintain the handle of the cam member in any position between a fully closed and an open position.

11. The cam clamp assembly of claim 1, wherein the link insert is formed from one flat piece with a first end and a second end, the first end having the second extension pivot axis, the second end, and a large partial disc with a pivot pin.

12. The cam clamp assembly of claim 1, wherein the first extension has a flat straight first portion and a second inclined portion defining a contact line, wherein the inclined portion is angled to the flat straight first portion enabling the cam member to contact tangentially the inclined portion at the contact line.

* * * * *